(12) United States Patent
Hite

(10) Patent No.: US 7,401,793 B1
(45) Date of Patent: Jul. 22, 2008

(54) ROLLER-TOW HARNESS

(76) Inventor: Joseph M. Hite, 1403 Alpha La., Crosby, TX (US) 77532

( * ) Notice: Subject to any disclaimer, the term of this patent is extended or adjusted under 35 U.S.C. 154(b) by 315 days.

(21) Appl. No.: 11/134,491

(22) Filed: May 20, 2005

(51) Int. Cl.
*B62D 51/04* (2006.01)
(52) U.S. Cl. ....................................................... 280/1.5
(58) Field of Classification Search .................. 280/1.5
See application file for complete search history.

(56) References Cited

U.S. PATENT DOCUMENTS

| | | | | |
|---|---|---|---|---|
| 3,077,292 A | * | 2/1963 | Gehrke | 224/184 |
| 4,396,091 A | * | 8/1983 | Anderson | 182/3 |
| 4,848,780 A | * | 7/1989 | Straub | 280/1.5 |
| 5,411,461 A | * | 5/1995 | Thomascik | 482/124 |
| 5,653,455 A | * | 8/1997 | Richards | 280/19 |
| 6,027,001 A | * | 2/2000 | Levitan | 224/184 |
| 6,607,208 B2 | * | 8/2003 | Dartland | 280/292 |
| 2006/0185571 A1 | * | 8/2006 | Leseberg | 114/253 |

* cited by examiner

*Primary Examiner*—Lesley D. Morris
*Assistant Examiner*—Michael Stabley

(57) ABSTRACT

A roller-tow harness for wear by a jogger or skater to tow behind him a second person on roller skates or roller blades. The harness consists of a wide belt that has fastening means in the back of the belt for connecting to at least one tow rope equipped with a grip handle for easy gripping by a second person that is being towed behind. The harness may optionally consist of a pair of shoulder straps to further stabilize the belt on the wearer and to further distribute the load from the wearer's waist to his chest and back.

7 Claims, 2 Drawing Sheets

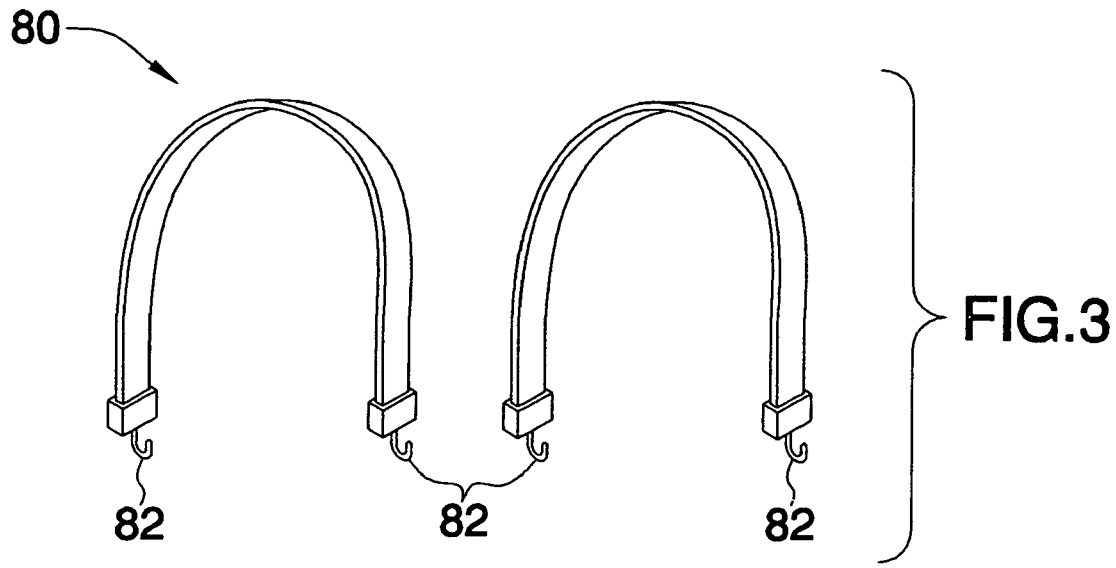
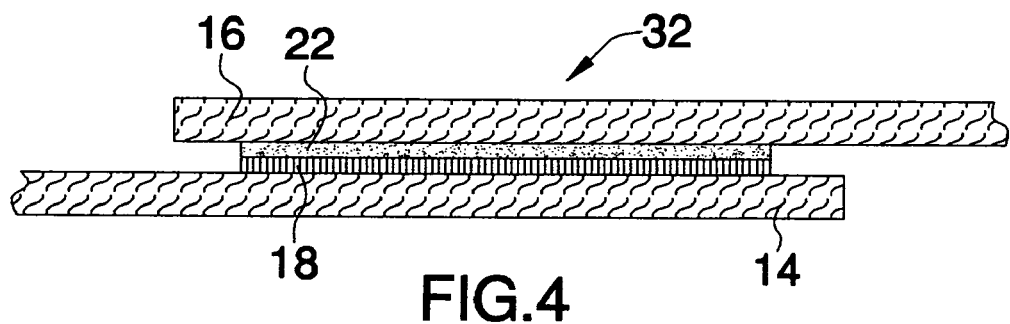
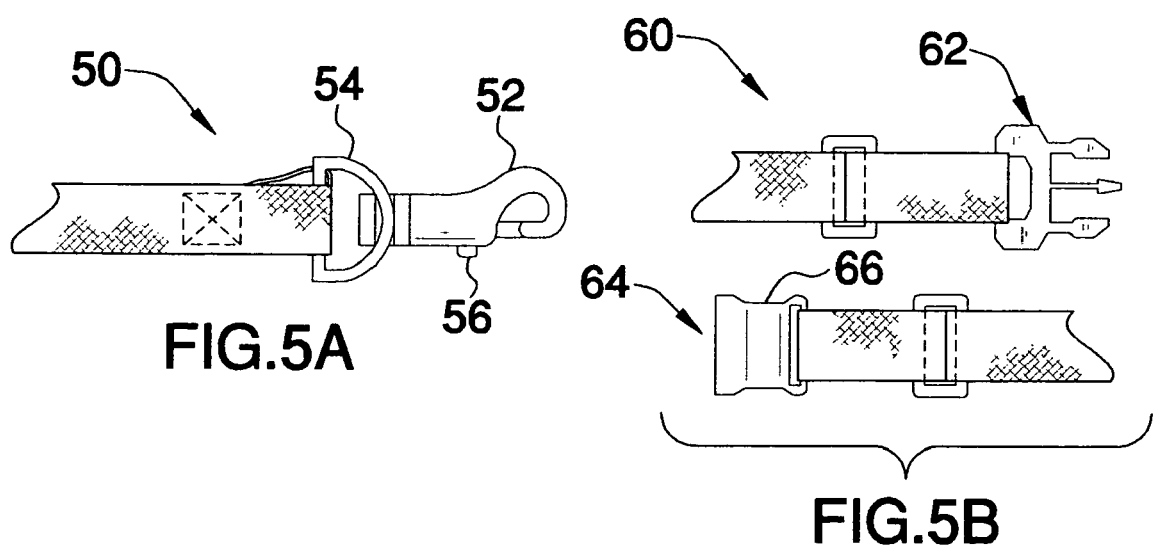

ROLLER-TOW HARNESS

FIELD OF THE INVENTION

The present invention generally relates to a harness to be worn by a jogger and more particularly, relates to a roller-tow harness to be worn by a jogger that is equipped with tow ropes in the back of the harness for towing a roller skater behind.

BACKGROUND OF THE INVENTION

In recent years, great emphasis has been placed on healthy living and active lifestyles by a majority of the population. One way to achieve healthy living and active lifestyle for an adult is the participation in the activity of jogging or running. Jogging can be accomplished either indoors on a running track or outdoors on a running track or on the sidewalks of a street. Roller blading or roller skating is another form of active lifestyles for some adults which can be carried out either in an indoor skating rink or outdoors on the sidewalks of a street.

To further improve the entertainment value of jogging or roller blade activity, and to further promote the togetherness in a family, an adult jogger sometimes takes along his children to join him in the activity. One popular form of such family activity is for the adult jogger to run on the sidewalk of a street, while his child or children follows him on roller skates or roller blades. While the physical endurance of a child is far short that of an adult, it frequently occurs that the child on the roller blade may be out of breath or out of energy long before the adult jogger is ready to quit. It is therefore desirable to provide a roller-tow harness for the adult jogger such that he can tow along the child on a roller blade, or on a roller skate, for prolonged period of exercise and to enable the achievement of family togetherness.

It is therefore an object of the present invention to provide a roller-tow harness for an adult jogger that is equipped with at least one tow rope for towing another person behind on a roller skate.

It is another object of the present invention to provide a roller-tow harness for an adult roller skater such that a child on a roller blade or roller skate can be towed behind him.

It is still another object of the present invention to provide a roller-tow harness for an adult jogger for towing a child on a roller blade behind him for a prolonged period of exercise time.

SUMMARY OF THE INVENTION

In accordance with the present invention, a roller-tow harness for an adult whom may be jogging or roller blading is provided. The harness enables the adult to tow behind another person, most likely a child, who is on a roller blade or on a roller skate to participate in the sport together.

In a preferred embodiment, the present invention roller-tow harness is constructed of a wide belt which can be worn on an adult's waist securely and comfortably, at least one tow rope which is connected to a back portion of the belt by mechanical means, including those of quick-release means, and a handle at the end of the tow rope opposite to the end that is connected to the belt for gripping by a second person that is towed behind the adult.

The roller-tow harness may optionally include a pair of shoulder straps to further improve the stability of the harness on the wearer. The roller-tow harness may also include hook-and-loop fasteners to hold a coiled tow rope in place when it is not in use. A variety of mechanical fastening devices can be used for connecting the tow rope to the harness, such as snap-on loops, quick-release connectors and quick-release buckles.

BRIEF DESCRIPTION OF THE DRAWINGS

The invention will now be described, by way of example, with reference to the accompanying drawings, in which:

FIG. 3 is a perspective view of optional shoulder straps for further stabilizing the harness.

FIG. 4 is a cross-sectional view of one of the mechanical means for fastening the harness on a wearer.

FIGS. 5A and 5B are plane views of a quick-release connector and a quick-release buckle, respectively.

DETAILED DESCRIPTION OF THE PREFERRED EMBODIMENT

The present invention discloses a roller-tow harness for wear by an adult jogger, roller skater or roller bladder. The harness is equipped with at least one tow rope such that a second person, most likely a child, on roller blades or roller skates can be towed behind the adult jogger, roller bladder or roller skater.

The present invention roller-tow harness enables a person, such as an adult jogger, to tow behind him a second person, most likely a child, that is on roller blades or roller skates. For instance, the harness allows a jogger to pull a roller bladder along for a ride during a jogging run. The harness not only allows a younger roller bladder to rest and glide behind a parent that is jogging, but it also adds resistance to the adult who is jogging and thus, making his or her workout more strenuous and thus, more effective.

Figure 1:
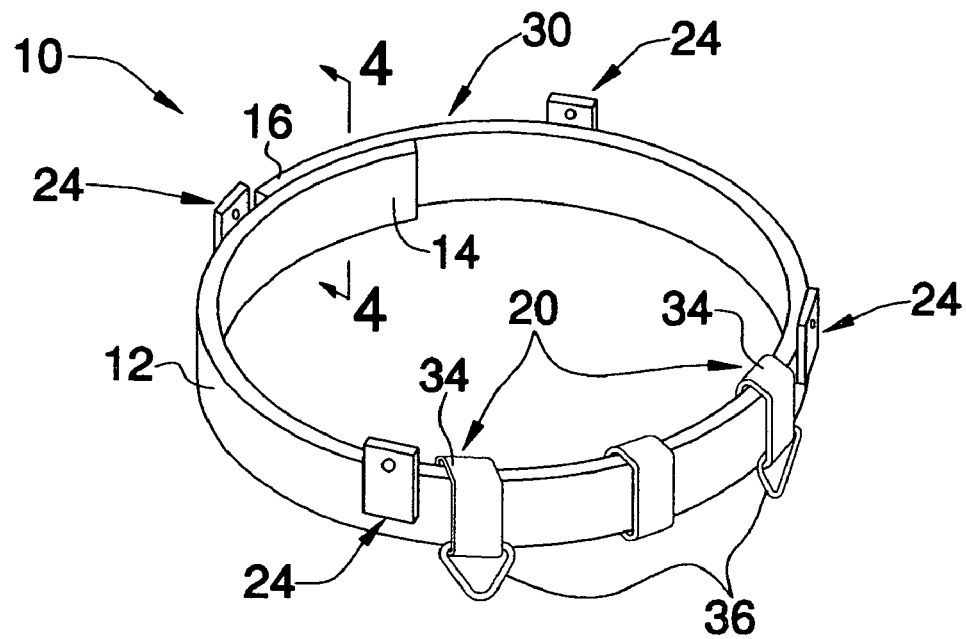
FIG. 1 is a perspective view of the present invention roller-tow harness.

Referring initially to FIG. 1, wherein a present invention roller-tow harness 10 is shown. The roller-tow harness 10 is constructed of a wide belt 12, which should be at least 4 inches wide, and preferably about 6 inches wide. The length of the belt 12 is optional, and a suitable length to fit most adults is about 41 inches. A larger length can also be provided for people having larger waistlines.

The belt 12 is equipped with at least one tow rope loop 20. More suitably, the belt 12 should be equipped with two tow rope loops 20, as shown in FIG. 1. The wide belt 12 can be advantageously fabricated in a polymeric material, such as a stretchable neoprene elastomer or nylon. The belt 12 should be covered with a fabric for more comfortable fit to the wearer's waist. Preferably, a cushioning layer such as a foam material should be placed between the fabric layer and the belt. The belt 12 may also be formed of natural materials such as leather.

The belt 12 utilizes a mechanical fastening means 30 for fastening the two ends 14,16 together around a wearer's waistline. One of such mechanical fastening means 30 may be advantageously a hook-and-loop means 32 such as that shown in enlarged, cross-sectional view in FIG. 4. A hook layer 18 is adhesively attached to the free end 14 of the belt 10, while a loop layer 22 is adhesively attached to an opposite free end 16 of the belt 10. The hook-and-loop means 32, shown in FIG. 4, can be advantageously used since it not only provides a secure fastening method, it further provides an adjustment to satisfy the comfort of a wearer along the length of the hook layer 18 and the loop layer 22.

The tow rope loops 20 may be formed of a nylon strap 34 encircling the belt 12 and contains metal loops 36. It should be noted that while metal loops 36 provide a simple and secure means for fastening to tow ropes 40, shown in FIG. 2, the metal loops 36 are by no means the only suitable attachment means. In the configuration shown in FIG. 2, the end 42 of the tow rope 40 is provided with a snap-on loop 44, which are each equipped with a latch 46 that is spring loaded such that when the snap-on loop 44 is pushed onto the metal loop 36, the latch 46 is deflected inwardly to allow the metal loop 36 to be hooked onto the snap-on loop 44. This type of snap-on loop 44 is widely used in the fastening industry and thus, there is no need to describe in detail its construction.

Figure 2:
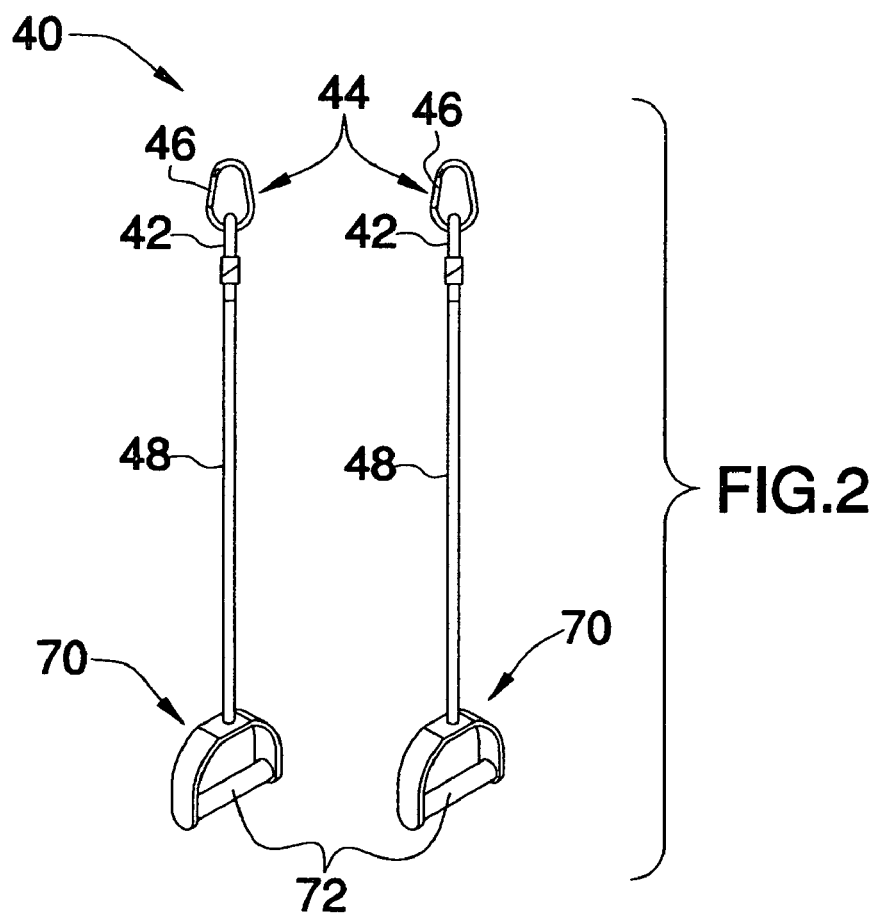
FIG. 2 is a perspective view of the tow ropes used on the harness.

Instead of the snap-on loop 44 shown in FIG. 2, other suitable means of quick-release connectors or quick-release buckles may also be used. For instance, a quick-release connector 50 is shown in FIG. 5A, while a quick-release buckle 60 is shown in FIG. 5B. The quick-release connector 50, is also known as a snaffle hook which consists of a hook portion 52 and a connector 54. By pulling back the thumb catch 56, the hook portion 52 can be quickly fastened to the metal loop 36 and then by releasing the thumb catch 56, the hook 52 is locked onto the metal loop 36.

The quick-release buckle 60 requires a male portion 62 to be inserted into the cavity 66 of a female portion 64. When the quick-release buckle 60 is used, the female portion 64 should be connected to the nylon straps 34, replacing the metal loop 36.

The tow ropes 40 can be provided in any suitable, resilient material, such as a nylon rope 48. A small elasticity in the nylon rope 48 would improve the comfort level of the wearer of belt 12 during a sudden pull on the handle 70 by the person that is towed behind. The nylon rope 48 may have a suitable length of about 24 inches and include a looped handle 70, such as that shown in FIG. 2, wherein the grip 72 of handle 70 is formed of wood or plastic.

A pair of shoulder straps 80, shown in FIG. 3, may further be connected to the belt 12 through hooks 82 on the straps and the tabs 24 fastened to the belt 12. Other fastening means, other than the hooks 82, such as the quick-release connectors 50 and the quick-release buckle 60, may also be used. The pair of shoulder straps 80 not only stabilize the belt 12 on the wearer's waist, but also help to distribute the load away from the waist of the wearer to his chest and back, thus making the wearing of the belt 12 more comfortable.

While the preferred embodiment of the invention have been described above, it will be recognized and understood that various modifications can be made in the invention and the appended claims are intended to cover all such modifications which may fall within the spirit and scope of the invention.

What is claimed is:

1. A roller-tow harness comprising:
   a belt formed of a polymeric material;
   a connecting means on a back portion of said belt;
   a pair of tow ropes each having a grip handle removably connecting to said connecting means; and
   a pair of shoulder straps releasably connected to said belt.

2. The roller-tow harness of claim 1, wherein said at least one tow rope is two tow ropes.

3. The roller-tow harness of claim 1, wherein said connecting means at one end of said tow rope is a quick-release connecting means.

4. The roller-tow harness of claim 1, wherein said connecting means on said at least one tow rope is a quick-release buckle.

5. The roller-tow harness of claim 1, wherein said connecting means on said at least one tow rope is a quick-release connector.

6. The roller-tow harness of claim 1, wherein said pair of shoulder straps is formed of a polymeric material.

7. The roller-tow harness of claim 1, wherein said belt is fastened around a wearer's waist by a hook-and-loop fastener.

\* \* \* \* \*